US011162964B2

(12) United States Patent
Friedman

(10) Patent No.: US 11,162,964 B2
(45) Date of Patent: Nov. 2, 2021

(54) AUTOMATED ALIGNMENT OF A TESTING SYSTEM

(71) Applicant: Siemens Healthcare Diagnostics Inc., Tarrytown, NY (US)

(72) Inventor: Glenn Friedman, Redding, CT (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 321 days.

(21) Appl. No.: 16/319,241

(22) PCT Filed: Jul. 19, 2017

(86) PCT No.: PCT/US2017/042912
§ 371 (c)(1),
(2) Date: Jan. 18, 2019

(87) PCT Pub. No.: WO2018/017749
PCT Pub. Date: Jan. 25, 2018

(65) Prior Publication Data
US 2019/0234984 A1 Aug. 1, 2019

Related U.S. Application Data

(60) Provisional application No. 62/365,225, filed on Jul. 21, 2016.

(51) Int. Cl.
*G01N 35/10* (2006.01)
*G01N 35/00* (2006.01)

(52) U.S. Cl.
CPC ..... *G01N 35/1011* (2013.01); *G01N 35/0099* (2013.01); *B01L 2200/025* (2013.01); *G01N 35/1002* (2013.01)

(58) Field of Classification Search
CPC ........... G01N 35/1011; G01N 35/0099; G01N 35/1002; B01L 2200/025
See application file for complete search history.

(56) References Cited

U.S. PATENT DOCUMENTS 3,635,094 A * 1/1972 Oberli ................. B01L 3/021
73/863.01
3,894,438 A 7/1975 Ginsberg
(Continued)

FOREIGN PATENT DOCUMENTS

JP 2004 325421 A 11/2004
JP 2005-531769 A 10/2005
(Continued)

OTHER PUBLICATIONS

Supplementary EP Search Report dated Jul. 10, 2019 of corresponding European Application No. 17831815.0, 5 Pages.
(Continued)

*Primary Examiner* — Samuel P Siefke
*Assistant Examiner* — Henry H Nguyen

(57) ABSTRACT

One embodiment provides a method of automatically aligning an indexing machine with a robotic end effector including: inserting, using a robotic arm, a hunting tool into an aperture, the hunting tool comprising a pressure sensitive tip; detecting, using a plurality of sensing beams, a first location of the hunting tool within the aperture; rotating, using the robotic arm, the hunting tool 180 degrees; detecting, using the plurality of sensing beams, a second location of the hunting tool within the aperture; calculating a runout magnitude and a runout direction based on the first location, the second location, and the robotic arm; inserting, using the robotic arm, the hunting tool into a target; determining, using the pressure sensitive tip, a location of the hunting tool with respect to the target; and thereafter, adjusting the location of the hunting tool with respect to the aperture and target based on said determined location and said calculated runout magnitude and direction. Other aspects are described and claimed herein.

13 Claims, 11 Drawing Sheets

(56) References Cited

U.S. PATENT DOCUMENTS

| | | | |
|---|---|---|---|
| 5,344,610 A | | 9/1994 | Shaw |
| 5,525,298 A | * | 6/1996 | Anami ............... G01N 35/1079 |
| | | | 422/533 |
| 5,736,403 A | | 4/1998 | Riall et al. |
| 7,457,686 B2 | | 11/2008 | Ding et al. |
| 2003/0187600 A1 | | 10/2003 | Barnes |
| 2004/0096368 A1 | | 5/2004 | Davis et al. |
| 2004/0267405 A1 | | 12/2004 | Fisch et al. |
| 2006/0127281 A1 | * | 6/2006 | Bjornson ............. G01F 23/185 |
| | | | 422/417 |
| 2014/0130614 A1 | * | 5/2014 | Zeng .................... B01L 3/0237 |
| | | | 73/863.01 |
| 2016/0011083 A1 | | 1/2016 | Barnes et al. |

FOREIGN PATENT DOCUMENTS

| | | |
|---|---|---|
| JP | 2011-174818 A | 9/2011 |
| JP | 2014-119291 A | 6/2014 |
| JP | 2015-232561 A | 12/2015 |
| WO | 97/20185 A1 | 6/1997 |
| WO | 2015/172025 A1 | 11/2015 |
| WO | WO-2015172025 A1 * 11/2015 ............. G01B 11/14 |

OTHER PUBLICATIONS

PCT International Search Report and Written Opinion dated Nov. 14, 2017 (11 Pages).

* cited by examiner

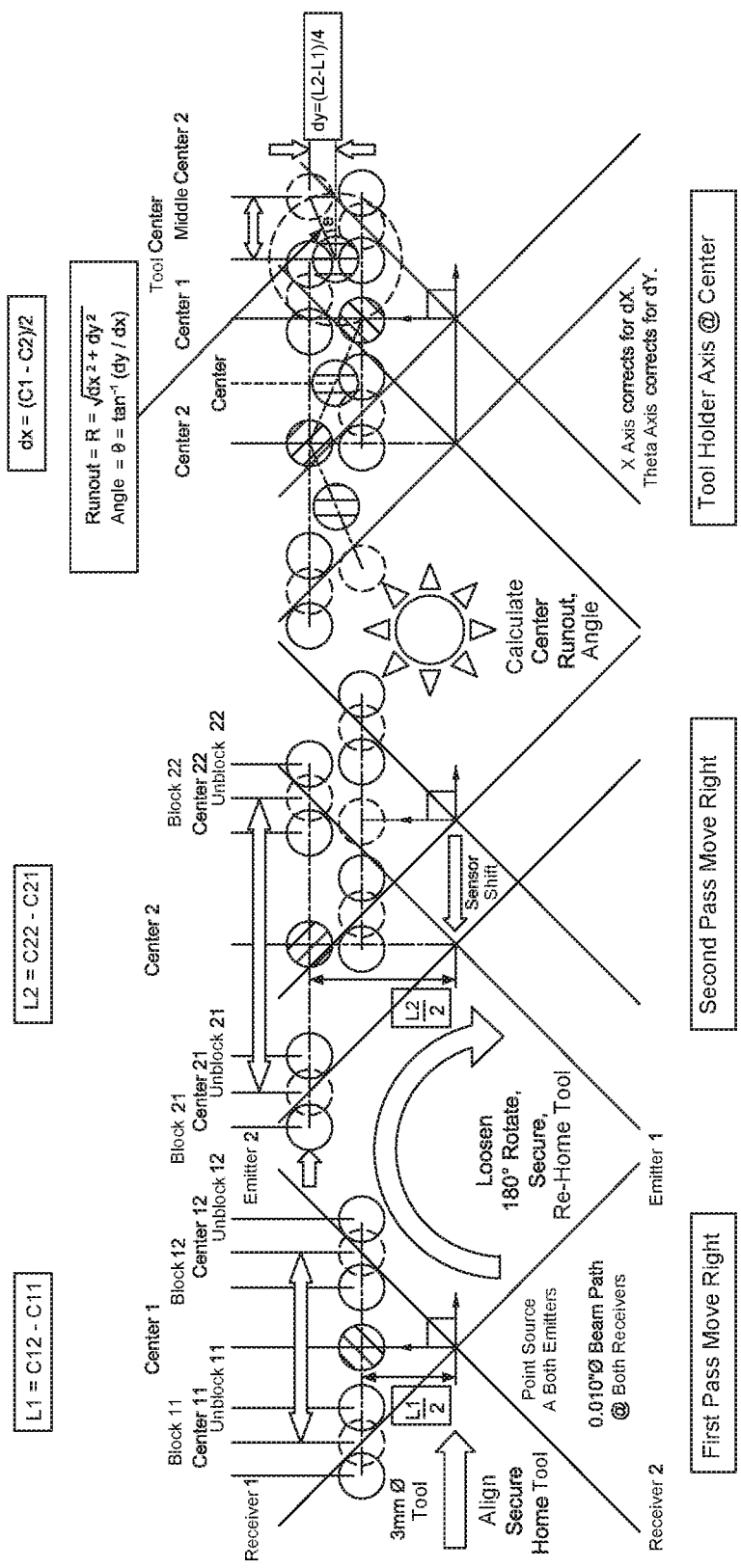

AUTOMATED ALIGNMENT OF A TESTING SYSTEM

CROSS-REFERENCE TO RELATED APPLICATIONS

This application claims the benefit of U.S. Provisional Application Ser. No. 62/365,225 filed Jul. 21, 2016, which is incorporated herein by reference in its entirety.

TECHNOLOGY FIELD

The present invention relates generally to an automated process for alignment of an indexing machine with regard to a robotic effector.

BACKGROUND

As the abilities of large scale automation increases, more and more processes are being transitioned to an operator-less environment. Lab testing systems generally require clearly defined reproducible results. This is because, in order to have a proper analysis, a huge number of tests must be performed, many of the tests being performed multiple times. Due to this repetitive nature, the testing process is perfectly suited to the automation process. However, because of the precise nature of the testing process, it can be difficult to accurately and consistently automate the majority of the steps involved. For example, using pipetting probes to sample tubes on a puck-based track is a very repetitive task. However, because of the variables involved and the precision required, it has proven difficult to fully automate this process.

Thus, currently, in order to perform the various steps of the testing process, some manual effort is required (e.g., alignment). This typically involves an operator visually inspecting the system and using various tools (e.g., tooling pins and plates) to adjust the pipette and sample tube. This is a slow and costly process when compared with a typical automation system. Thus, there is a need for a quicker, more efficient, and more robust method of performing automation with regard to pipette sampling.

SUMMARY

Accordingly, an embodiment provides an automated probe switch alignment system comprising: a robotic arm; a probe, having a sampling tip, attached to the robotic arm; a hunting tool attached to the robotic arm, the hunting tool having a pressure sensitive tip; wherein the sampling tip of the probe is aligned with a predetermined target, based on the alignment of the hunting tool; and wherein the hunting tool alignment is determined based on force detected at the pressure sensitive tip.

A further embodiment provides a probe runout sensor device comprising: a body having a top and bottom; the body comprising an aperture from the top to the bottom; the top of the body comprising: one or more sensing beams running across the aperture; wherein the one or more sensing beams detect the location of an object passing through the aperture.

Another embodiment provides a method of automatically aligning an indexing machine with a robotic end effector comprising: inserting, using a robotic arm, a hunting tool into an aperture, the hunting tool comprising a pressure sensitive tip; detecting, using a plurality of sensing beams, a first location of the hunting tool within the aperture; rotating, using the robotic arm, the hunting tool 180 degrees; detecting, using the plurality of sensing beams, a second location of the hunting tool within the aperture; calculating a runout magnitude and a runout direction based on the first location, the second location, and the robotic arm; inserting, using the robotic arm, the hunting tool into a target; determining, using the pressure sensitive tip, a location of the hunting tool with respect to the target; and thereafter, adjusting the location of the hunting tool with respect to the aperture and target based on said determined location and said calculated runout magnitude and direction.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 11 is a graphical representation of runout magnitude and direction calculation.

DETAILED DESCRIPTION

Embodiments herein are directed to an automation system, which can be used to align a diagnostic instrument of robotic pipetting probes to sample tubes on puck-based tracks, cuvettes, or reagent packs in indexing rings. Advantageously, an embodiment's automation system provides robust and efficient mechanisms to ensure that the process of robotic pipetting is consistent and accurate.

As discussed herein, the ability to ensure proper alignment and operation of automated devices during a repetitive test is vital to ensuring the results are reproducible. However, current automation solutions either lack precision or are prohibitively expensive and, thus, not suitable replacements for a human operator. Because the experiments require extreme accuracy, precise tools and complex procedures are required that are manually performed by one or more trained field service technicians.

Accordingly, an embodiment provides an improvement via an ultra-accurate alignment system to ensure proper interaction between a probe and a target. The automated alignment system may utilize a probe switch and/or a probe runout sensor. Using one or more of these (i.e., the probe switch and runout sensor), an embodiment can simplify the process, while still achieving a highly accurate and repeatable alignment.

A further embodiment may utilize a long-reach high-resolution probe switch. The high-resolution probe switch may have a mechanical plunger at the tip for detecting surfaces (e.g., a surface in proximity to an application-specific target). In another embodiment, a mechanical plunger may utilize a spring-loaded low-force plunger to detect the surface of a target area. Additionally, or alternatively, an embodiment may comprise a rigid bearing system. This highly rigid bearing system may be able to more accurately detect an edge of a target. In another embodiment, a mechanical plunger, as discussed herein, may work in conjunction with a probe runout sensor.

The probe runout sensor, as further described herein, may precisely measure the magnitude (e.g., in millimeters, centimeters, inches, etc.) and direction (e.g., radians, degrees, etc.) of the probe. This may allow an embodiment to determine a straightness factor, or an amount of straightness error. Based on the determined straightness of the probe, a further embodiment may take an action to correct the straightness (e.g., adjust the magnitude or direction of the probe). By correcting the straightness, an embodiment is in a better position, such that the true probe axis and tip are in correct alignment when moved to the center of a target, or to an individual indexing position within a set of rings.

Figure 1:
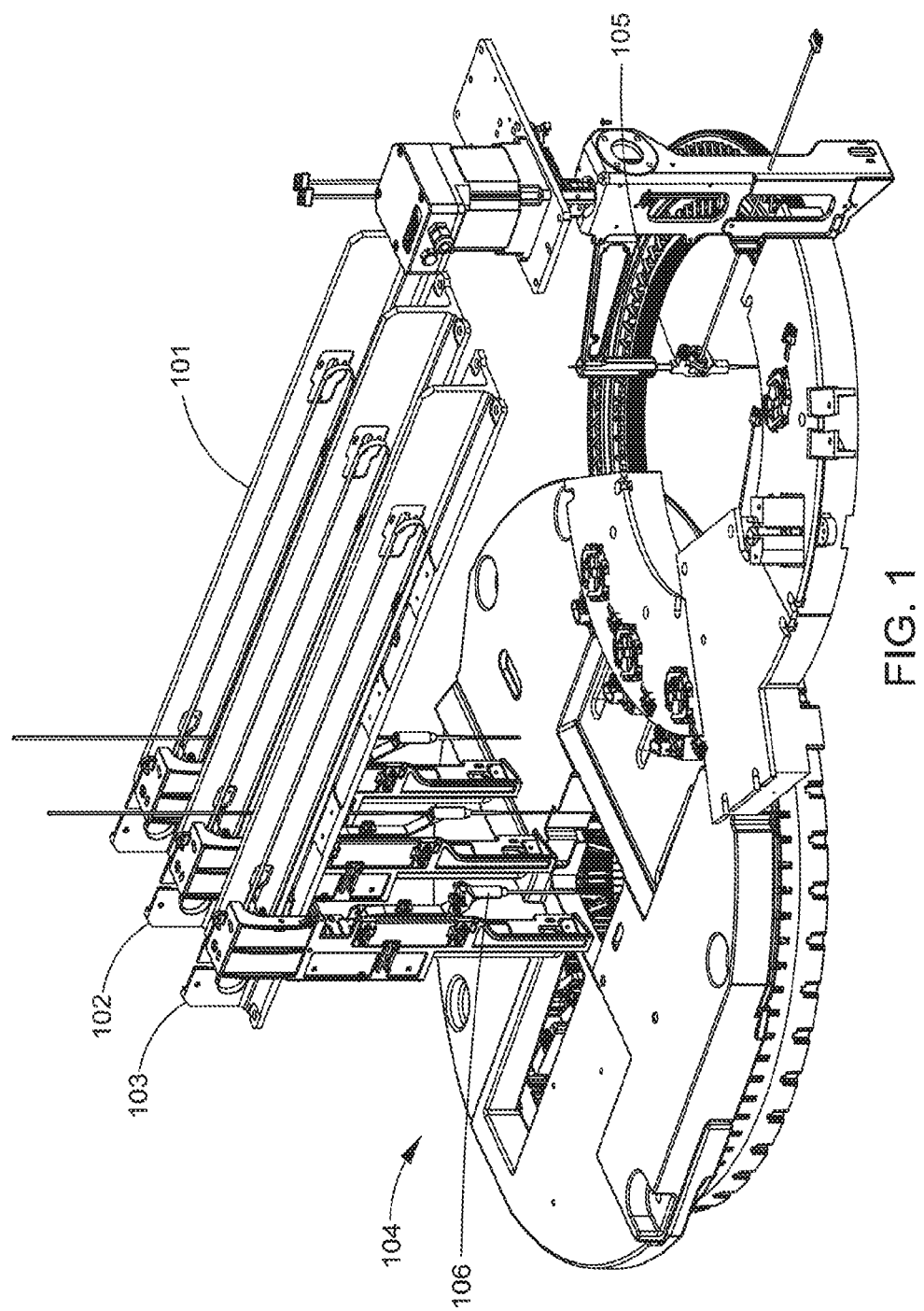
FIG. 1 is an illustrative view of an example system for automated alignment for an indexing machine with a robotic end effector.

Referring now to FIG. 1, an embodiment may have one or more robotic arms with probes 101, 102, 103 (e.g., linear, rotary, etc.). The robotic arm probes allow an embodiment to interface with various other testing equipment 104 (e.g., tracks, consumables, indexing ring, etc.). Another embodiment may also comprise a long-reach, high-resolution probe switch 105 with a spring-loaded, low-force plunger.

Figure 2:
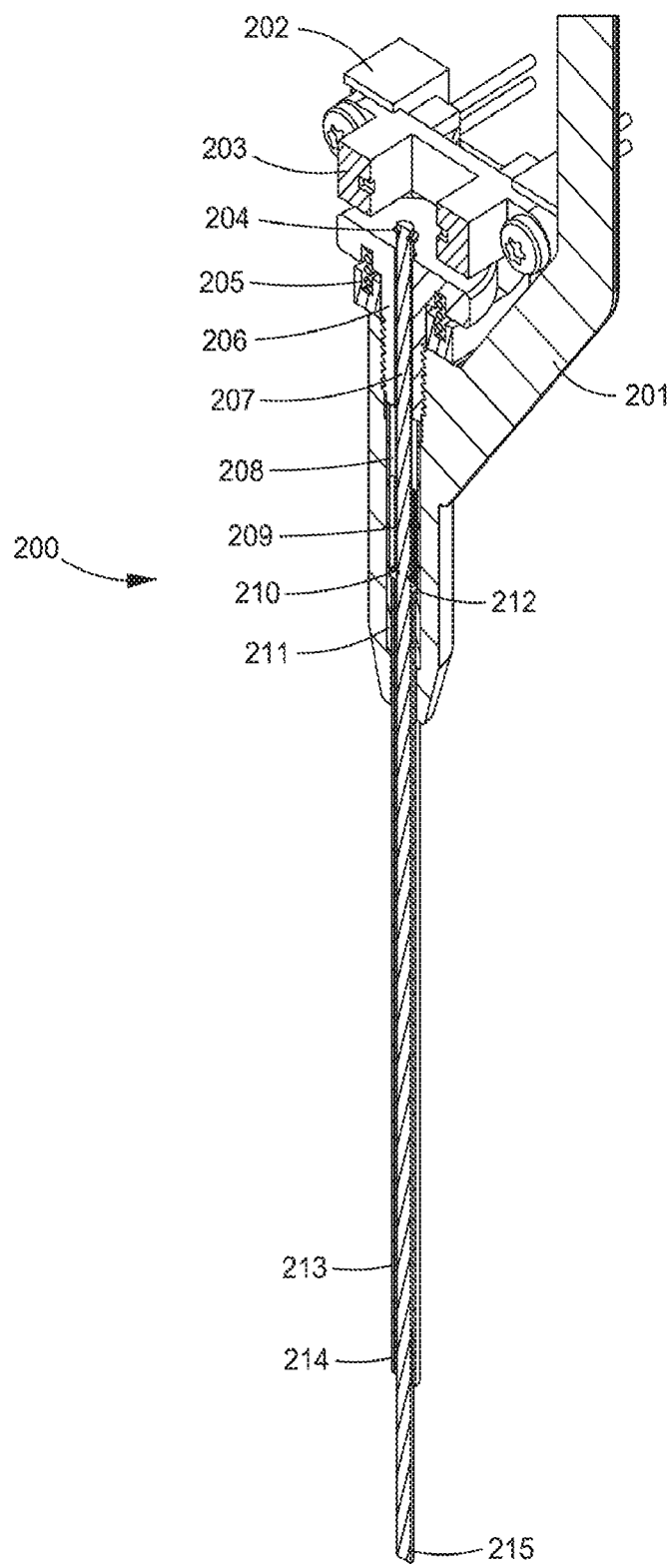
FIG. 2 is an illustrative view of an example elongated hunting tool.

In one embodiment, an elongated (i.e., long) hunting tool 106 may be used. A non-limiting example of an elongated hunting tool 200 is shown in FIG. 2. The long hunting tool 200 may further include a reagent probe arm 201, as shown in FIG. 2. Additional non-limiting components of the long hunting tool 200, as shown in FIG. 2, may be: a sensor bracket 202, a wide sensor (e.g., Optek) 203, an e-clip 204, a bracket compression spring 205, a locking screw 206, a rod 207, a tube disk 208, a rod compression spring 209, a collar 210, a flange bushing 211, a hypo tube 213, a vertical tube 212, and a straight bushing 214. Optek is a registered trademark of Optek-Danualt GmbH Corporation in the United States of America and other countries. It should be appreciated by those skilled in the art, that one or more of each of the aforementioned components may be included in an embodiment (e.g., two e-clips).

As shown in FIG. 2, the maximum rotational offset (R.O.) allowed may be ±0.33 mm from the bottom of the collar 210 to the tip of the probe 215. It should be understood by those skilled in the art that the R.O., as shown in FIG. 2, is only a single, non-limiting example of an R.O. limit, and that in additional embodiments, the limit may be larger or smaller.

The long hunting tool 200, as shown in FIG. 2, may require varying levels of force during various activities. Illustrative non-restricting examples may be, for example, 2.7 ounces of initial force, 3 ounces of sensor force, and 3.7 ounces of over travel force. Thus, in one embodiment, the varied levels of force may result in a total travel of around 6 mm. In one non-limiting example, the long hunting tool 200 may be approximately 2 mm longer than the reagent probe to ensure proper alignment. Additionally, as shown in FIG. 2, the hunting tool 200 may be removed by vertically withdrawing from the reagent probe arm 201 upward.

Figure 3:
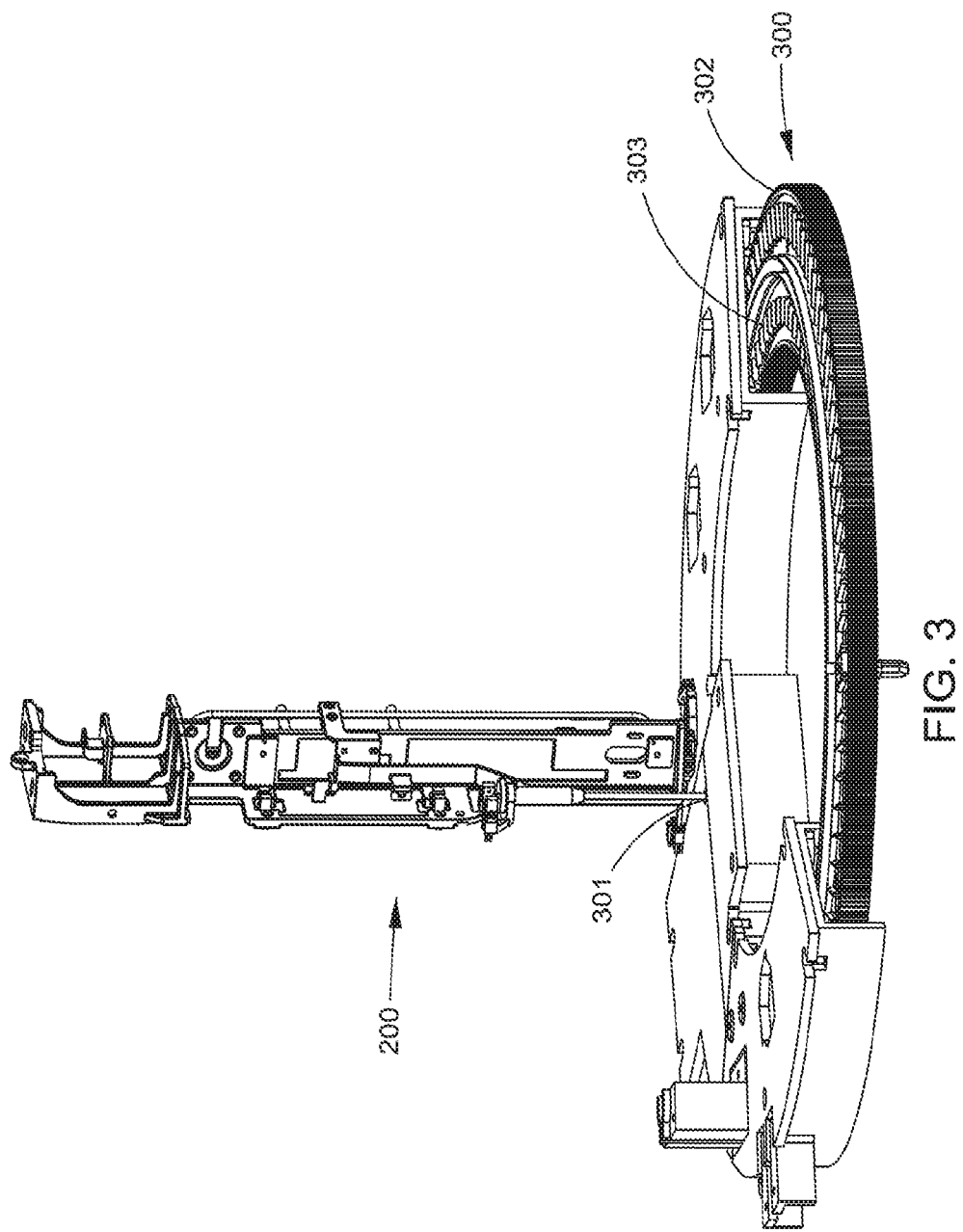
FIG. 3 is an illustrative view of an example elongated hunting tool with a cuvette ring slotted target.

In a further embodiment, alignments may be performed with round targets 301 on an indexing reagent pack tray. Additionally, or alternatively, the alignments may be performed for slotted targets. Referring now to FIG. 3, an embodiment, such as the elongated hunting tool 200, may perform the alignments via a slotted target system 300 (e.g., on inner cuvette rings 303 and outer cuvette rings 302).

Figure 4:
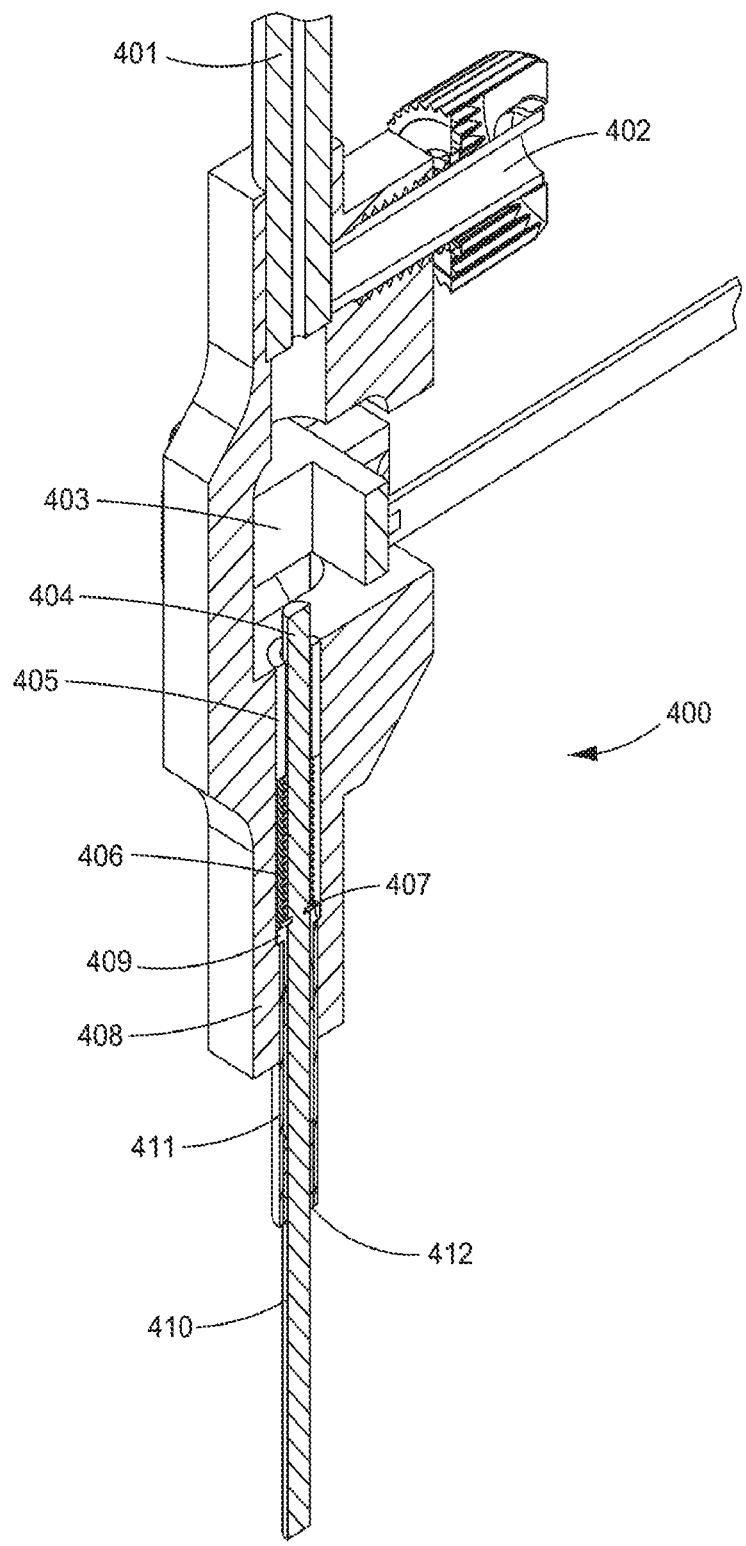
FIG. 4 is an illustrative view of an example shortened hunting tool.

In another embodiment, a shortened (i.e., short) hunting tool 400 may be used. A non-limiting example of a shortened hunting tool 400 is shown in FIG. 4. The short hunting tool 400 may further include, as shown in FIG. 4, a sample probe 401. Additional non-limiting components of the short hunting tool 400, as shown in FIG. 4, may be: a lock bracket 402, a wide sensor (e.g., an Optek wide sensor) 403, a rod 404, a tube disk 405, a rod compression spring 406, an e-clip 407, a collar 408, a bracket 409, a flange bushing 411, a hypo tube 410, and a straight bushing 412. As with the long hunting tool, it should be appreciated by those skilled in the art, that one or more of each of the aforementioned components may be included in an embodiment (e.g., two e-clips) in the short hunting tool 400.

As shown in FIG. 4, the maximum R.O. allowed may be ±0.23 mm from the bottom of the collar to the tip of the probe. It should be understood by those skilled in the art that the R.O., as shown in FIG. 2, is only a single non-limiting example of a R.O. limit, and that in additional embodiments, the limit may be larger or smaller.

The short hunting tool, as shown in FIG. 4, may require varying levels of force during various activities. Illustrative non-restricting examples may be, for example, 2.7 ounces of initial force, 3 ounces of sensor force, and 3.7 ounces of over travel force. Thus, in one embodiment, the varied levels of force may result in a total travel of around 6 mm. In one non-limiting example, the short hunting tool may be approximately 2 mm longer than the sample probe to ensure proper alignment. Additionally, as shown in FIG. 4, the short hunting tool may be removed by vertically detaching it from the reagent probe arm downward.

Figure 5:
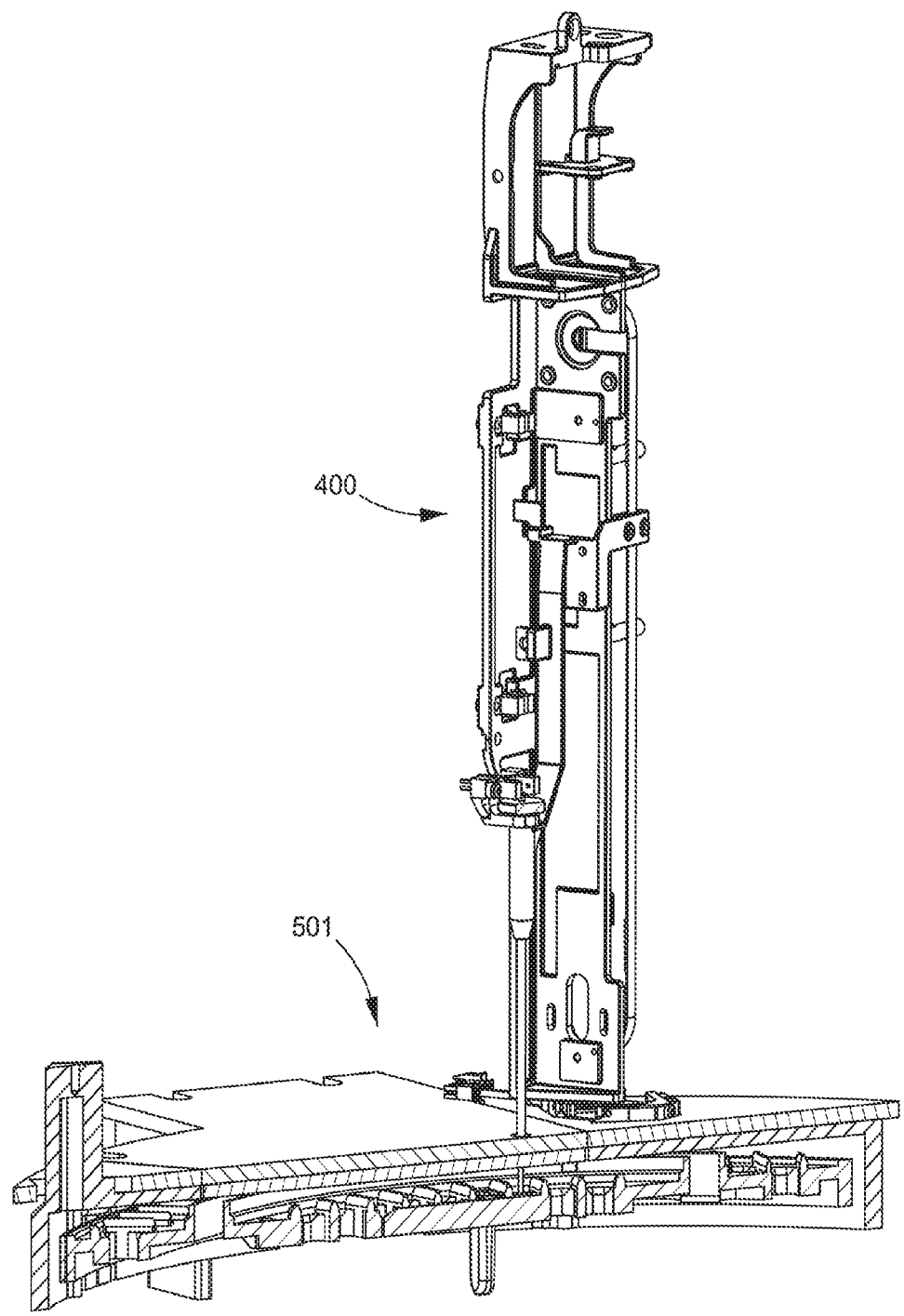
FIG. 5 is an illustrative view of an example shortened hunting tool with a cuvette ring slotted target.

Using the short hunting tool, an embodiment may mount the short hunting tool to a sample probe arm and perform alignments. In a further embodiment, alignments may be performed with sample track pucks. Additionally, or alternatively, the alignments may be performed for a tip tray indexer that presents consumable tips. Referring now to FIG. 5, an embodiment may perform the alignments via a slotted target system 501 (e.g., on inner cuvette rings and outer cuvette rings).

Figure 6:
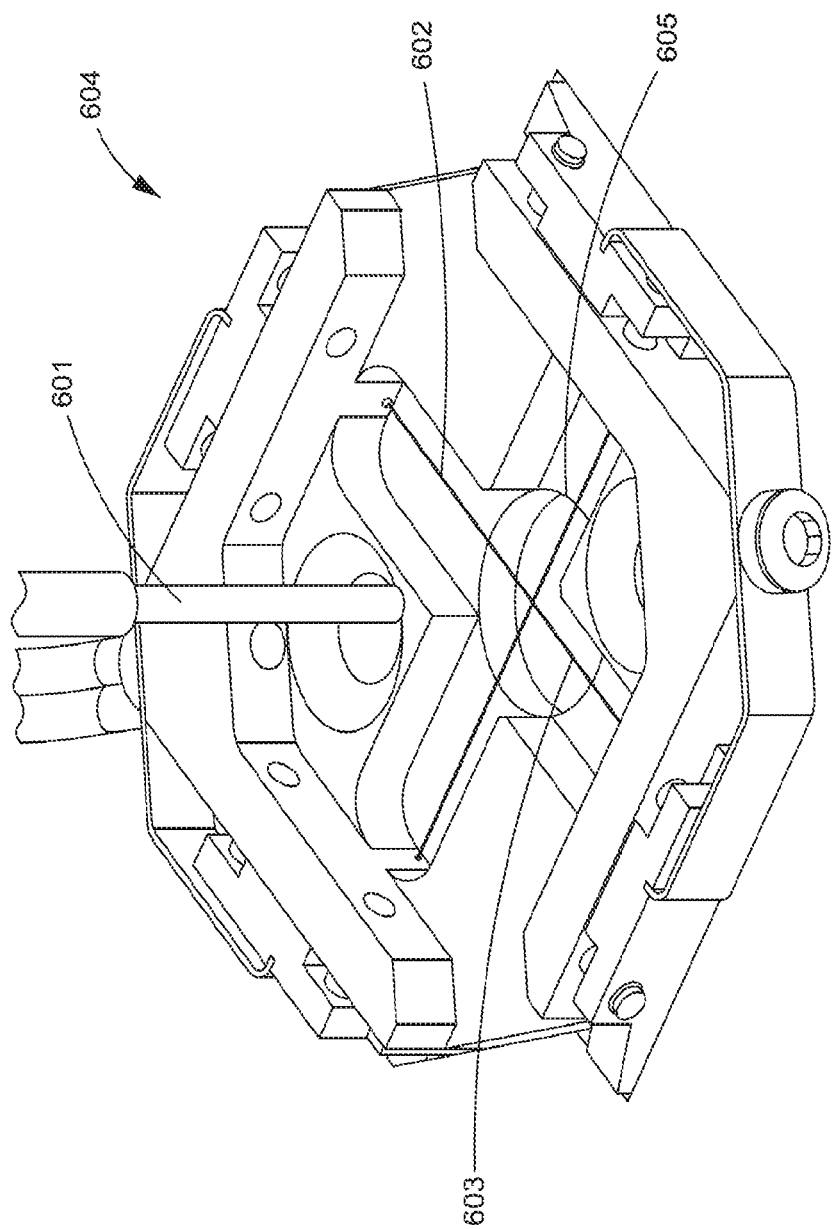
FIG. 6 is an illustrative view of an example probe runout sensor.

In one embodiment, as discussed herein, a probe runout sensor 604 may be utilized to assist in the alignment process. For example, a probe runout sensor 604 may have one or more sensing beams running across an opening (i.e., an aperture) 605, such as that shown in FIG. 6. The probe runout sensor can have a body having a top and bottom. In an embodiment, the one or more sensing beams can include a horizontal beam 603 and a vertical beam 602. The two beam system shown in FIG. 6 is only one possible embodiment, various other embodiments (e.g., one beam, three beam, four beam, five beam, etc.) may also be used. The beams may be any type of known beam detection, for example, laser, infra-red, optical, photoelectric, etc. As shown in FIG. 6, an embodiment may have a probe runout sensor with dual thru-beams arranged orthogonally to each other. This allows for an embodiment to detect the offset of the pressure sensitive probe tip 601 with extreme accuracy. Because an embodiment knows where the bottom collar of the probe arm is (see FIGS. 2 and 4), it can determine the insertion point relative to the probe holder via robotic arm position.

Figure 7:
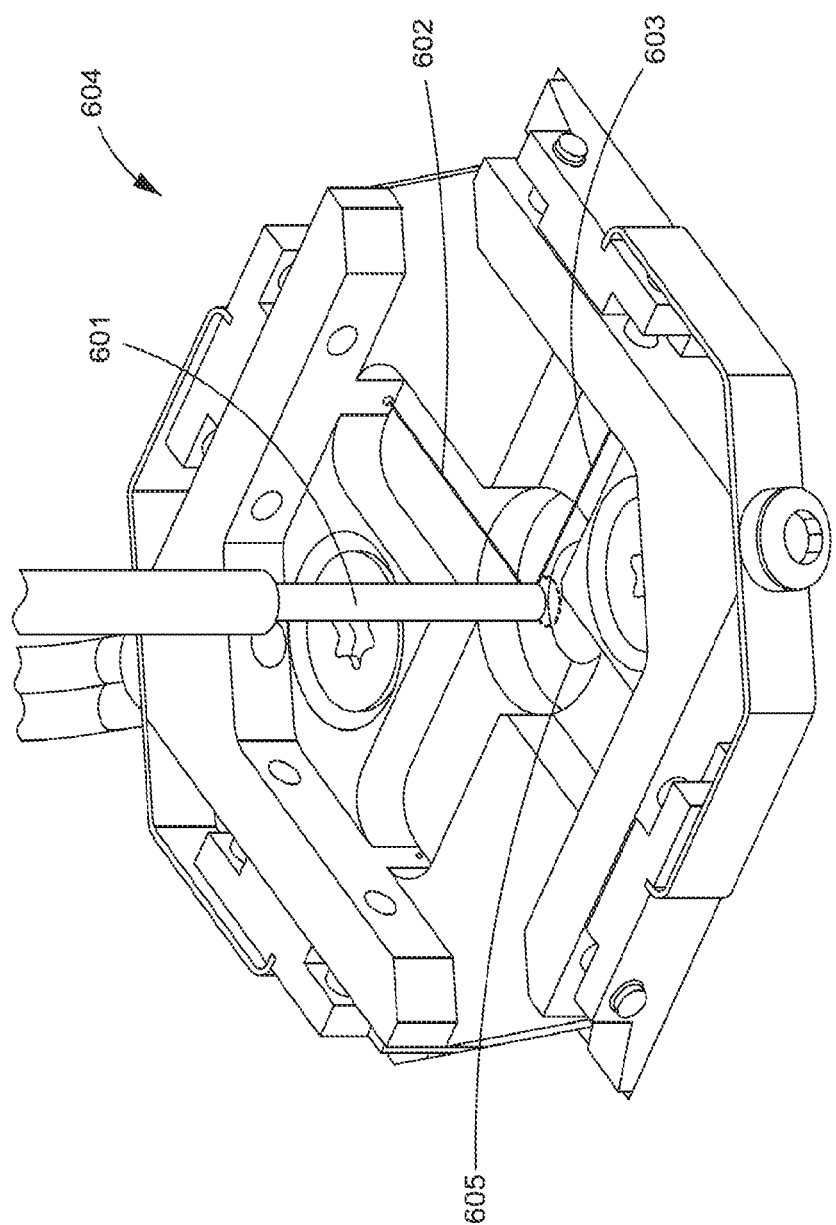
FIG. 7 is an illustrative view of an example probe runout sensor with beams blocked by a probe tip.

Thus, in a further embodiment, the sensor may detect the position of the pressure sensitive probe tip 601 as it passes though the opening 605 of the probe runout sensor 604. As shown in FIG. 7, once the pressure sensitive tip 601 is low enough, it may intersect the one or more beams 602, 603, thus indicating the pressure sensitive probe tip 601 position relative to the arm position. Thus, if the probe tip moves horizontally in a single direction, it may block or unblock one of the beams 602. In one embodiment, the pressure sensitive probe 601 may be restricted from proceeding further through the probe runout sensor 604 if it fails to block all of the beam sensors.

In one embodiment, it may be difficult if not impossible to remove or correct all the alignment issues because both long and short hunting tools are mechanical systems, which have typical limitations, such as: bearing clearances, machining and straightness errors, and mounting errors. Thus, the addition of a runout sensor allows for an embodiment to combine multiple systems together to help ensure the most accurate and aligned probe possible. Correcting for the runout allows an embodiment to increase the ability of an embodiment to find the center of a target. In order to correct the runout, the magnitude and direction (typically referred to as run/mag/dir) needs to be measured.

Figure 8:
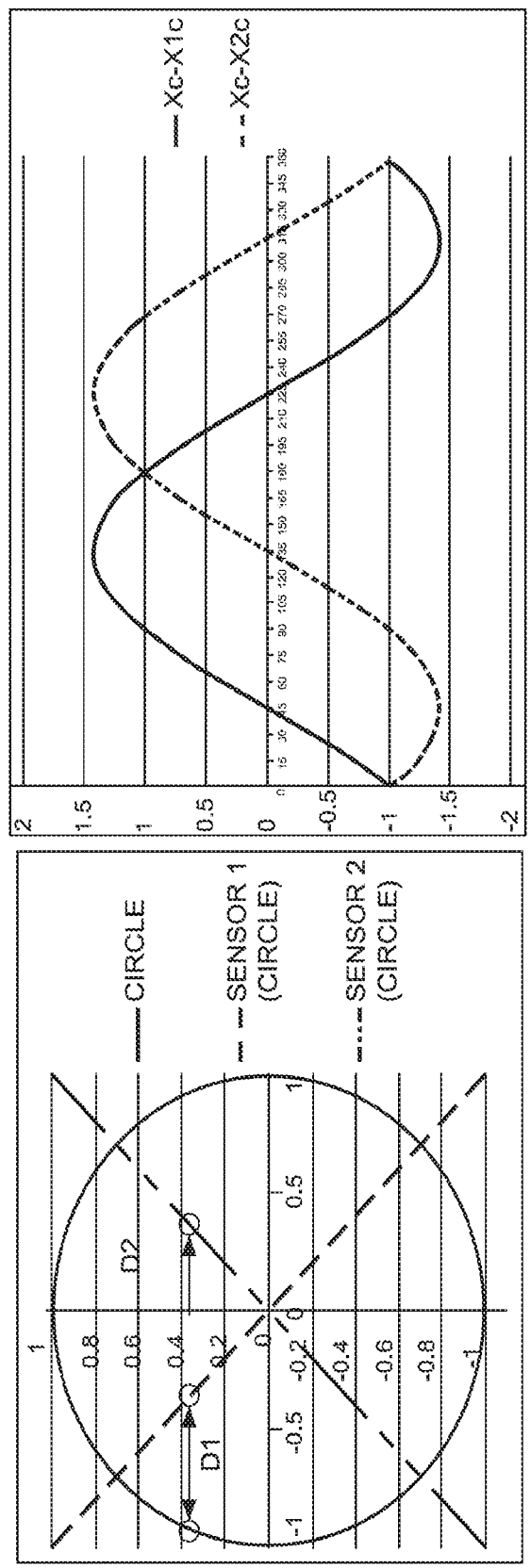
FIG. 8 is a graphical view of an example sensor output along 360° circle boundary.
Figure 9:
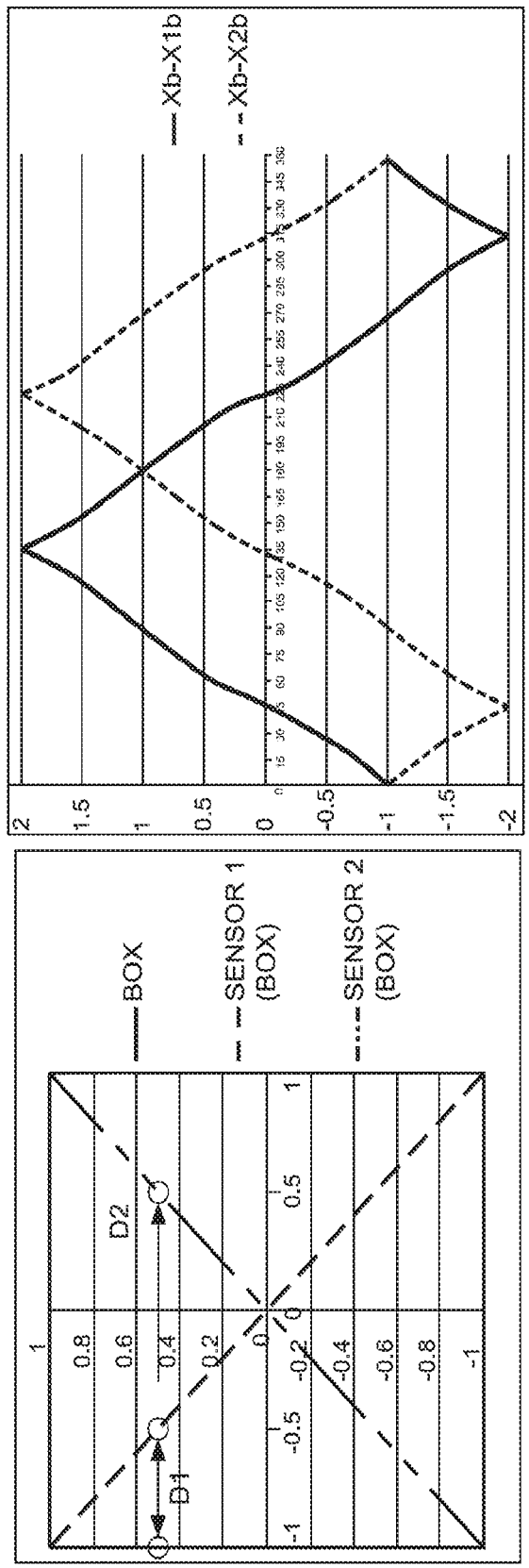
FIG. 9 is a graphical view of an example sensor output along 360° square boundary.

In one embodiment, the output of the probe runout sensor may be a pair of distance-to-beam measurements (e.g., D1, D2) from the probe center along the sensor's X and Y coordinate system (e.g., defined at 45° to both beams). In a further embodiment, the points at the boundary of the sensing zone may be plotted at regular intervals in the XY space (e.g., given XY scale of 1=100% of the boundary radial distance). An embodiment may then map the distance-to-beam measurements (e.g., D1, D2) into Dθ space (e.g., beam distance vs. θ sweep) for points along the boundary. This mapping may be done based on various increments, (e.g., 1°, 5°, etc.) from 0° to 360°. Referring now to FIG. 8, in an embodiment, the circle boundary may take on the typical shape of sinusoidal curves with a 90° phase shift, such as that shown in FIG. 8. Alternatively, a square boundary, such as that in FIG. 9, adds a unique twist by the composition of sloped lines and harmonic curves with 45° nodes. This may be important, as it would generally be assumed that straight lines would exist between the direction-reversal peaks. However, straight lines may only result if the points along the boundary are equally spaced.

Because one of the keys to ensuring proper alignment is knowing the runout relative to a "perfectly straight tool" mounted in the tool holder, an embodiment may employ the use of a very straight gauge tool with equivalent mounting features. In an embodiment, a gauge tool may set the sensor "zero" point, which may then be passed anywhere through the sensing zone because it is determined via the mounting of the sensor relative to the robotic arm, such as that shown in FIG. 9, thus the zero point does not have to be at the beam intersection. Once calibrated, an embodiment may replace the gauge tool with the hunting tool (e.g., long or short) and repeat the process to determine the relative change in the XY position which will calculate the magnitude and direction of the runout (i.e., the run/mag/dir).

Figure 10:
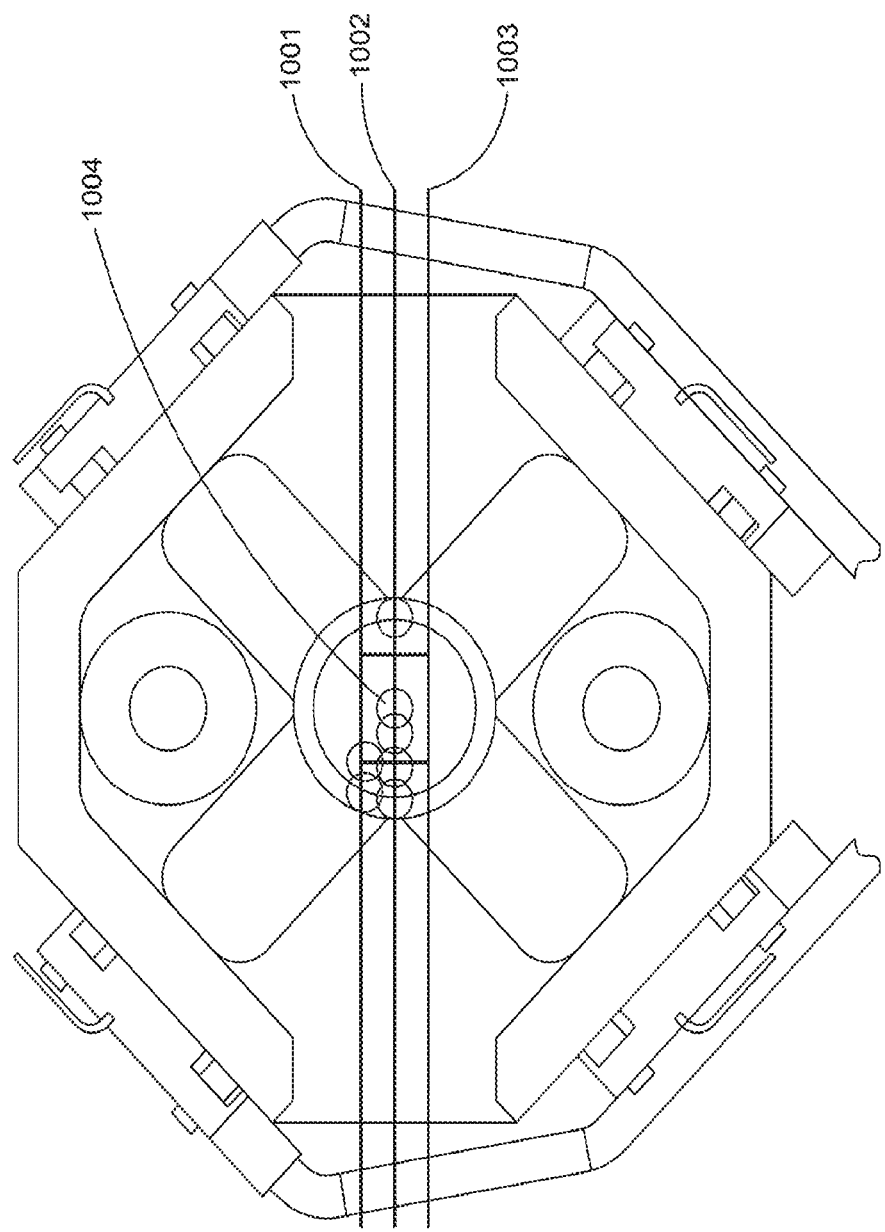
FIG. 10 is an illustrative view of an example gauge tool over a probe runout sensor.

In another embodiment, the initial calibration is not required. Generally, the first calibration, using a gauge tool, will almost always have some small, but meaningful error, when determining run/mag/dir. Thus, an embodiment may be able to improve the process by marking with visual scribe lines 1001, 1002, 1003 at 180° from the hunt tools (e.g., short and long hunting tool), and the tool holder(s) mounted to the robotic arm, such as that shown in FIG. 10.

Firstly, an embodiment may align the tool and tool holder lines and pass the probe through the runout sensor. Next, an embodiment may rotate the tool 180°, or until the tool is once more aligned to the tool holder lines, and again pass through the runout sensor. By preforming the above process, an embodiment is able to determine the relative change in XY position between the two points (e.g., where the probe intersects the runout sensor at both 0° and 180°), creating a line. This line may then be considered by an embodiment as a means of representing the diameter of the runout circle. Based on the newly determined runout circle diameter, a new "true zero" point may be projected as the midpoint of the determined diameter, with respect to the tool holder neutral axis by a theoretically straight tool. Thus, the run/mag/dir may be calculated from the midpoint to the tool tip after the second pass through the sensor. A non-limiting detailed example of the runout magnitude and direction process using the probe runout sensor and the probe switch is illustrated in FIG. 11.

Although the present invention has been described with reference to exemplary embodiments, it is not limited thereto. Those skilled in the art will appreciate that numerous changes and modifications may be made to the preferred embodiments of the invention, and that such changes and modifications may be made without departing from the true spirit of the invention. It is therefore intended that the appended claims be construed to cover all such equivalent variations as fall within the true spirit and scope of the invention.

I claim:

1. An automated probe switch alignment system comprising:
    a robotic arm;
    a probe, having a sampling tip, attached to the robotic arm; and
    a hunting tool attached to the robotic arm, the hunting tool having a pressure sensitive tip;
    a probe runout sensor device having one or more sensing beams for detecting at least one location of the hunting tool,
    wherein the sampling tip of the probe is aligned with a predetermined target, based on an alignment of the hunting tool, and
    wherein the hunting tool alignment is determined based on force detected at the pressure sensitive tip and at least one location of the hunting tool sensed by the probe runout sensor device;
    wherein the probe runout sensor device for detecting the at least one location of the object comprises:
    a body having a top and a bottom,
    the body comprising an aperture from the top to the bottom,
    the top of the body comprising:
        one or more sensing beams running across the aperture,
    wherein the one or more sensing beams detect the location of the object passing through the aperture.

2. The system of claim 1, wherein the hunting tool is a reagent hunting tool.

3. The system of claim 2, wherein the predetermined target comprises one of:
    round targets on an indexing reagent pack, slotted targets on inner cuvette rings, and slotted targets on outer cuvette rings.

4. The system of claim 2, further comprising a reagent probe arm attached to the robotic arm,
   wherein the reagent hunting tool is inserted through the reagent probe arm attached to the robotic arm.

5. The system of claim 4, wherein the reagent hunting tool is removable from the reagent probe arm.

6. The system of claim 1, wherein the hunting tool is a sample hunting tool.

7. The system of claim 6, wherein the predetermined target comprises one of:
   sample track pucks, tip tray indexers for consumable tips, inner cuvette rings, and outer cuvette rings.

8. The system of claim 6, further comprising a sample probe attached to the robotic arm,
   wherein the sample probe is configured to be inserted into the sample hunting tool.

9. The system of claim 6, wherein the sample hunting tool is removable from the sample probe.

10. The system of claim 1, wherein the pressure sensitive tip of the hunting tool extends lower than the sampling tip of the probe.

11. The system of claim 1, wherein the one or more sensing beams comprise a plurality of sensing beams.

12. The system of claim 11, wherein the plurality of sensing beams determine, based on a predetermined movement pattern of the object, a position in a horizontal plane of the object, and wherein vertical alignment of the object is determined based the position in the horizontal plane.

13. The system of claim 1, wherein the object passing through the aperture is at least one of: the probe and the hunting tool.

\* \* \* \* \*